(12) United States Patent
Boeing et al.

(10) Patent No.: US 6,405,534 B1
(45) Date of Patent: Jun. 18, 2002

(54) EVACUATION AND FILL VALVE ASSEMBLY AND METHOD FOR USING THE SAME

(75) Inventors: Joachim Boeing, Lake Orion; Dalibor Zaviska, Rochester; Vaughn Swanson, W. Bloomfield, all of MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/449,328

(22) Filed: Nov. 24, 1999

(51) Int. Cl.$^7$ .................................................. F15B 7/00
(52) U.S. Cl. ........................................................ 60/584
(58) Field of Search .................. 60/584, 453; 137/854, 137/625.48

(56) References Cited

U.S. PATENT DOCUMENTS 5,279,124 A * 1/1994 Aymond ...................... 60/584

* cited by examiner

Primary Examiner—Edward K. Look
Assistant Examiner—Thomas E. Lazo
(74) Attorney, Agent, or Firm—Rader, Fishman & Grauer PLLC

(57) ABSTRACT

A non-powered evacuation and fill valve assembly is provided that is suitable for use in connection with hydraulic brake system. The assembly utilizes a pressure differential and/or the properties of material expansion to provide a tight seal. During evacuation of air from the system, the assembly is in an "open" position to permit air to pass. After the air has been evacuated from the system and the system has been filled with fluid, the valve assembly will assume a "closed" position. Thereafter, a tight seal is provided as long as the system is filled with a requisite amount of fluid.

8 Claims, 6 Drawing Sheets

EVACUATION AND FILL VALVE ASSEMBLY AND METHOD FOR USING THE SAME

FIELD OF THE INVENTION

The present invention relates generally to hydraulic brake systems. More particularly the present invention relates to a non-powered evacuation and fill valve assembly and a method for using the same in connection with a hydraulic brake system.

BACKGROUND OF THE INVENTION

Air within a hydraulic brake system will be compressed as the pressure within the system increases. This action reduces the amount of force that can be transmitted by the fluid. Therefore, it is important to keep all air out of the hydraulic system.

In vehicles, when an anti-lock brake system(ABS) unit is installed, air is evacuated from the hydraulic circuit before the unit is pre-filled with brake fluid. During the evacuation and fill process, solenoid valves for each brake circuit must be actuated. To effectuate the activation of the solenoid valves, a number of conventional designs require the connection of an electrical supply to the unit. However, this connection results in increased cycle time and cost in the vehicle assembly line.

Other conventional designs incorporate a spring-biased, normally closed, rubber check valve in which a very low spring force is applied to allow the valve to open during evacuation. However, during normal braking operations involving a sudden pedal release, the spring force is often not sufficient to keep the valve in the closed position. This situation can permit air to enter through the accumulator seals and result in a "soft" pedal, which can lead to eventual brake failure.

SUMMARY OF THE INVENTION

The present invention recognizes the disadvantages and limitations commonly associated with conventional hydraulic brake systems. Moreover, the present invention essentially utilizes a pressure differential or plug expansion to provide a "latching" or "locking" effect in connection with a non-powered evacuation and fill valve assembly. In the context of the present invention, the term "non-powered" means without the use of an external electric connection.

In one embodiment of the present invention, the evacuation and fill valve assembly is comprised of a valve and valve plate that connects low pressure and high pressure lines in each brake circuit. The assembly evacuates the air out of every part of the hydraulic cylinder unit and is typically switched on only once during the evacuation and pre-filling process (to evacuate air). Thereafter, the assembly typically remains in the closed position.

During the evacuation of air from the system, the aforementioned assembly stays open to allow air to be evacuated from the low pressure line. During fill or during subsequent testing and thereafter, the assembly remains closed to break the connection between low pressure and high pressure lines. Because the present invention makes use of a hydraulic pressure differential, there is no need for an electrical connection to actuate the solenoid valves. Further, the present invention eliminates the problem of designs that use a spring-biased rubber check valve by keeping the valve closed and secured during normal braking operations.

In another embodiment of the present invention, the evacuation and fill valve assembly is comprised of a plug that is formed of a material that expands in communication with brake fluid. After the filling process, the plug takes in and/or "absorbs" brake fluid, and expands. The expanded plug establishes a permanent connection between a valve body and the valve plug. This "latched" or "locked" condition exists as long as there is a sufficient amount of brake fluid in the system to expand the plug. As in the case of the previously mentioned, embodiment, no electrical connection is required.

In accordance with an embodiment of the present invention, a non-powered evacuation and fill valve assembly is provided that is suitable for use in connection with hydraulic brake system having a low pressure circuit, a higher pressure circuit, and a master cylinder. The assembly is comprised of a molded rubber valve including a retaining seal and a sealing area; a steel insert; and a valve plate that may include a retaining portion. During evacuation of air from the system, said rubber valve is in an open position relative to the valve plate to permit air in the low pressure circuit to flow through the evacuation and fill valve to the master cylinder. After evacuation of air from the system, a pressure differential is created on both sides of the evacuation and fill valve and it will move to a closed position relative to the valve plate and thereafter provide a tight seal as long as the system is filled with fluid.

In accordance with another embodiment of the present invention, a non-powered evacuation and fill valve assembly is provided that is comprised of a plug and a valve body. The plug is formed from a material, such as a plastic or rubber, which expands in communication with brake fluid. Preferably, the plug includes a rubber seal that, when in position, prevents air from entering the system.

BRIEF DESCRIPTION OF THE DRAWINGS

The present invention will be more readily understandable from consideration of the accompanying drawings, wherein.

DETAILED DESCRIPTION OF PREFERRED EMBODIMENTS

The present invention will be described in detail with reference to drawing FIGS. 1–6, which form a part of this disclosure.

Figure 1:
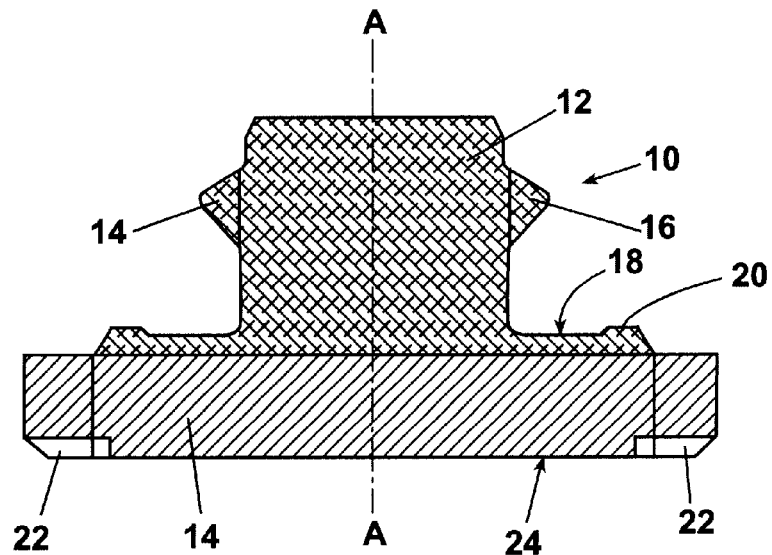
FIG. 1 is a section view of an embodiment of a valve provided in accordance with an aspect of the present invention.

Referring first to FIG. 1, a sectional view of an embodiment of a valve 10 provided in accordance with an aspect of the present invention is shown. The valve 10 includes a central axis A and is preferably comprised of an upper portion 12 and a lower insert 14.

The upper portion 12 preferably has a generally cylindrical shape and is formed of rubber. However, other materials that serve a resilient sealing function in an automotive fluid environment may also be used to construct the upper portion 12. In a preferred embodiment of the present invention, the valve 10 includes: (a) an retaining seal 16 that extends radially outward from central axis A; (b) a lower rim 18 positioned below the retaining seal 16 that extends radially outward from the central axis A; and (c) a lower annular protrusion 20 that extends in a generally upward direction from the lower rim 18.

Figure 1A:
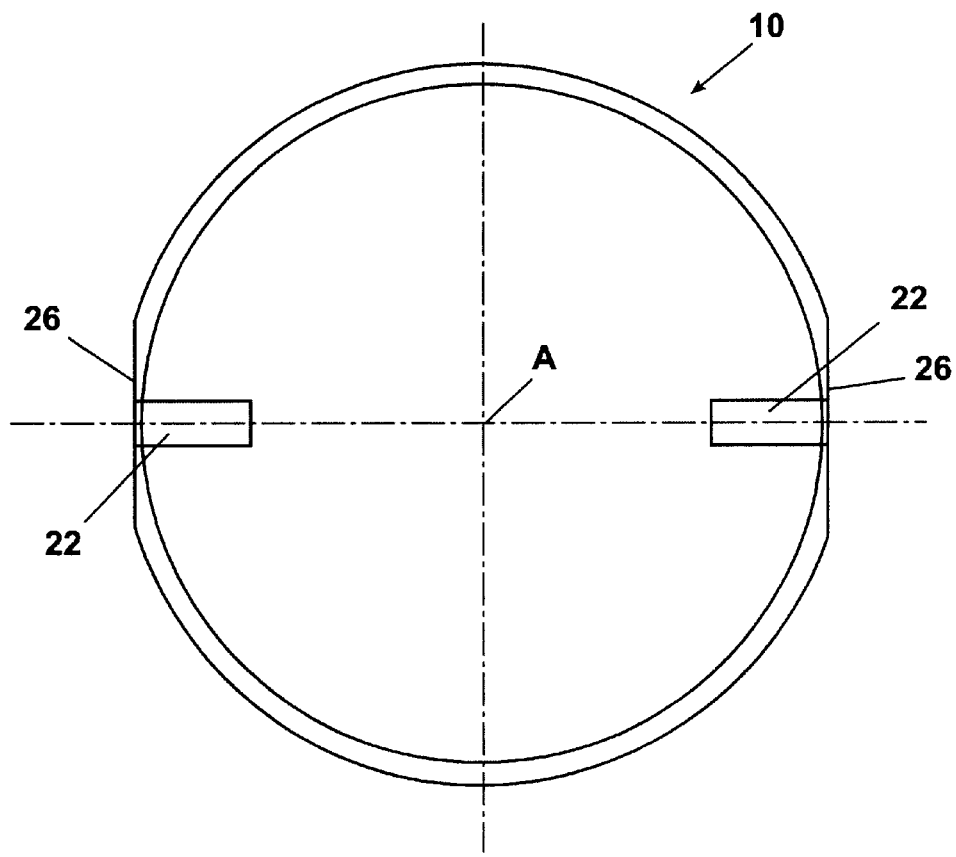
FIG. 1A is a bottom plan view of the valve shown in FIG. 1.

The lower insert 14 preferably is formed from a metal, such as steel, however other conventional materials may be used. In a preferred embodiment, the insert 14 includes at least one notch 22, and preferably two generally, rectangular-shaped notches 22 positioned at opposed edges of the lower surface 24 of the insert 14. FIG. 1A is a bottom view of the preferred embodiment of the valve 10 illustrated in FIG. 1. As better illustrated in FIG. 1A, the lower insert 14 is generally circular and preferably also includes one or more flattened edge portions 26.

Figure 2:
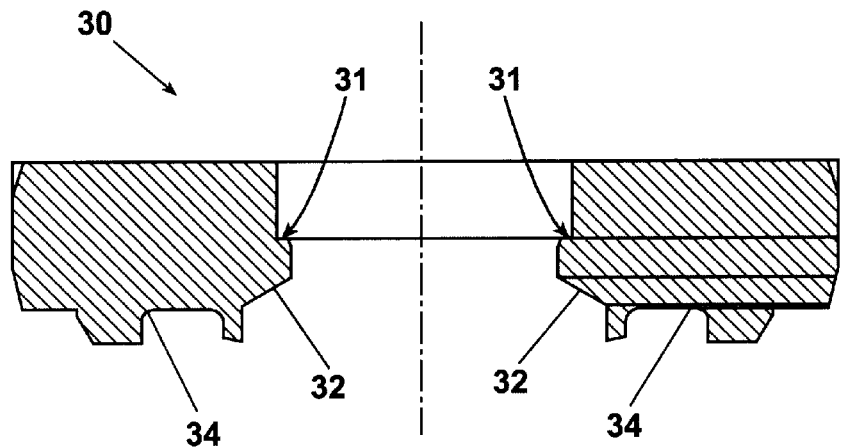
FIG. 2 is a section view of an embodiment of a valve plate provided in accordance with an aspect of the present invention.

FIG. 2 depicts a preferred embodiment of a valve plate 30 constructed in accordance with the present invention. The valve plate 30 has a generally annular shape and includes a retaining portion 31. The retaining portion 31 preferably is an annular stepped portion. The plate 30 is preferably comprised of a metal, such as steel. It is important to note that the plate 30 can also be formed from other conventional materials provided that such materials are suited for the intended environment, i.e., a hydraulic brake fluid environment.

Figure 2A:
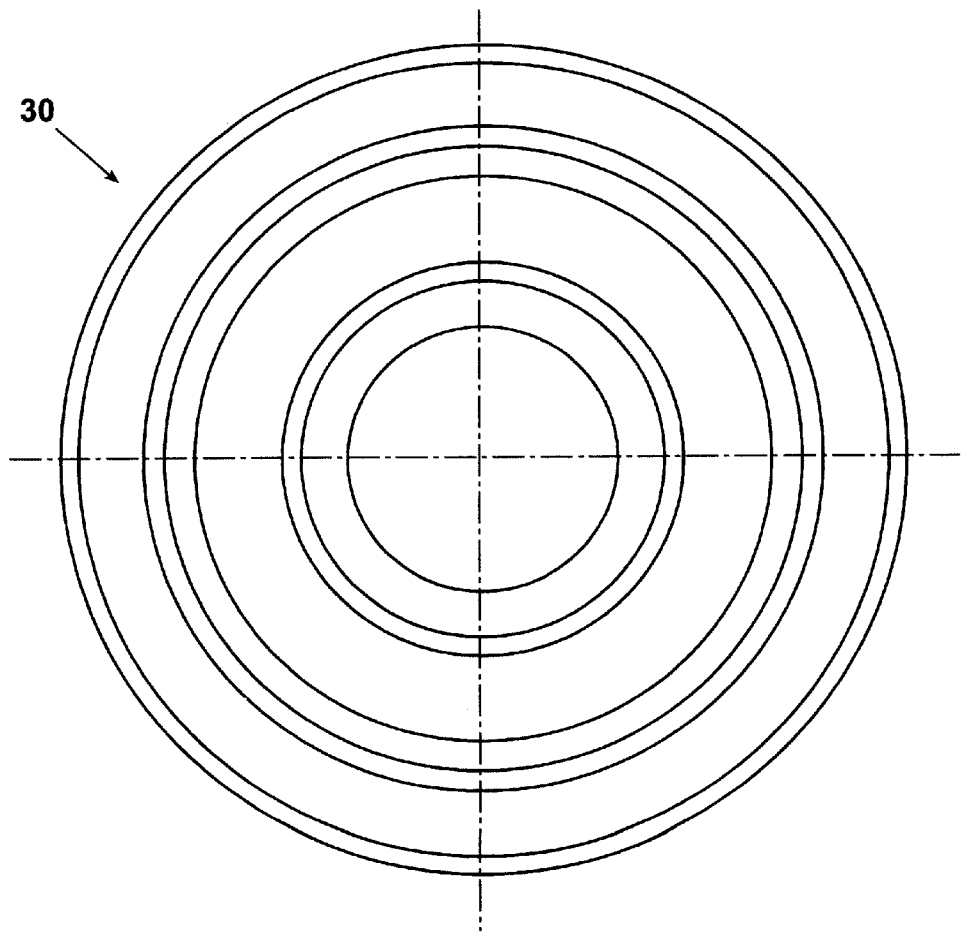
FIG. 2A is a bottom plan view of the valve plate shown in FIG. 2.

A preferred embodiment of the valve plate 30 includes first annular recess 32 and a second annular recess 34. When the valve 10 and plate 30 are brought into sealing communication, the first annular recess 32 is designed to communicate with the retaining seal 14, and the second annular recess 34 is designed to communicate with the second annular recess 34. FIG. 2A generally depicts a bottom plan view of the plate 30 shown in FIG. 2.

Figure 3:
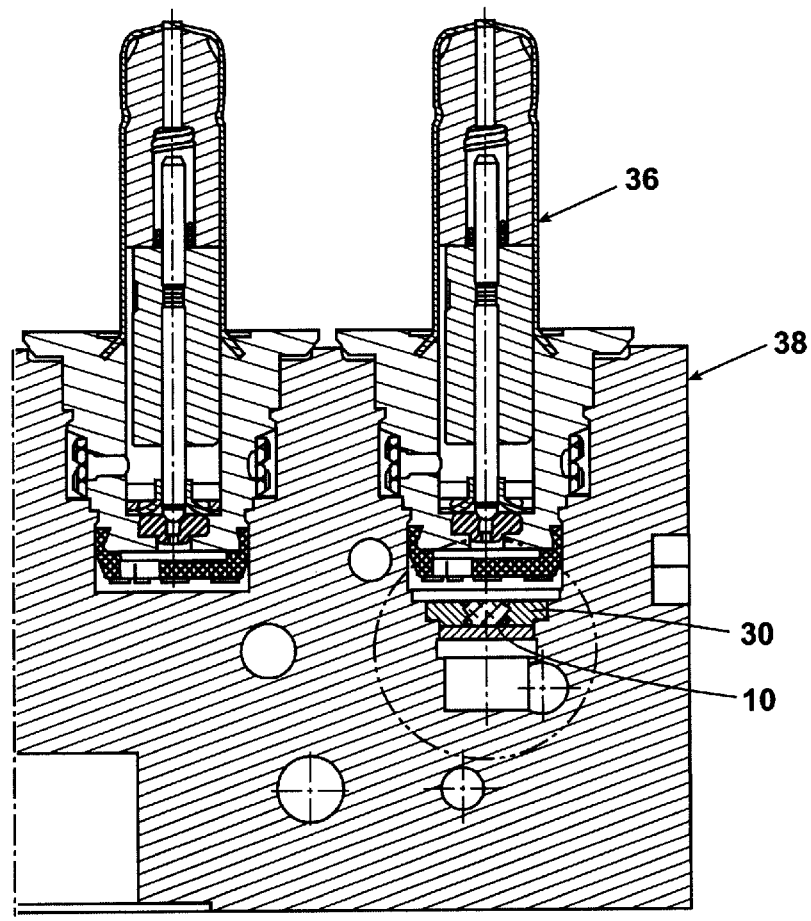
FIG. 3 is a section view that illustrates an evacuation and fill valve assembly shown in FIG. 3.
Figure 3A:
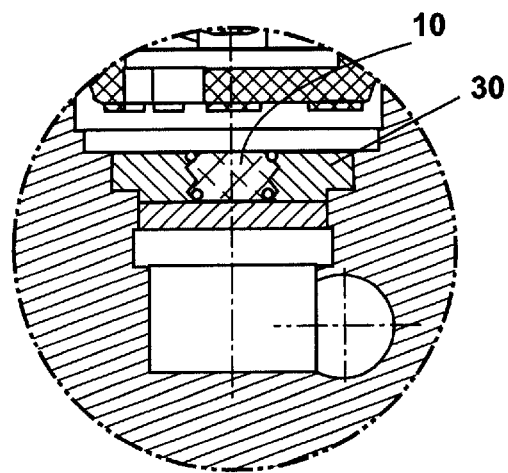

FIG. 3 is a section view that illustrates a valve 10 and plate 30 assembly shown in the context of a larger assembly that includes an outlet valve 36 and an ABS housing 38. FIG. 3A is an enlarged view of the evacuation and fill assembly shown in FIG. 3.

Figure 4:
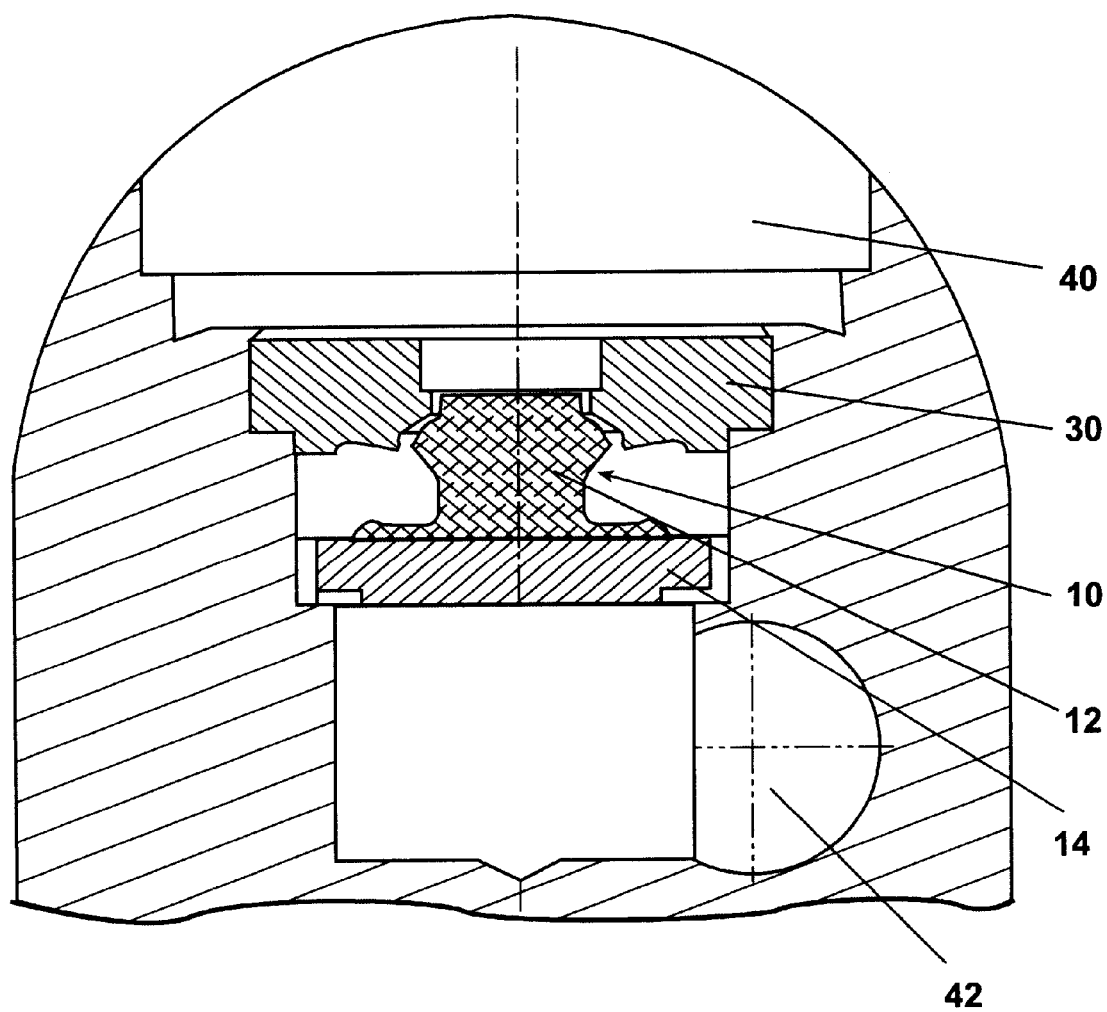
FIG. 4 is a section view showing a preferred evacuation and fill valve assembly in the open position.

As shown in FIG. 4, a valve 10 and valve plate 30 are provided in connection with a normally closed (NC) valve bore 40 of each brake circuit. The master cylinder connection is identified generally by the number 42. Preferably, the upper portion 12 is a rubber part that is molded onto a stamped steel insert 14 with two notches 22 and flats 26. The valve plate 30 is secured in the ABS/TCS unit housing 38.

Figure 5:
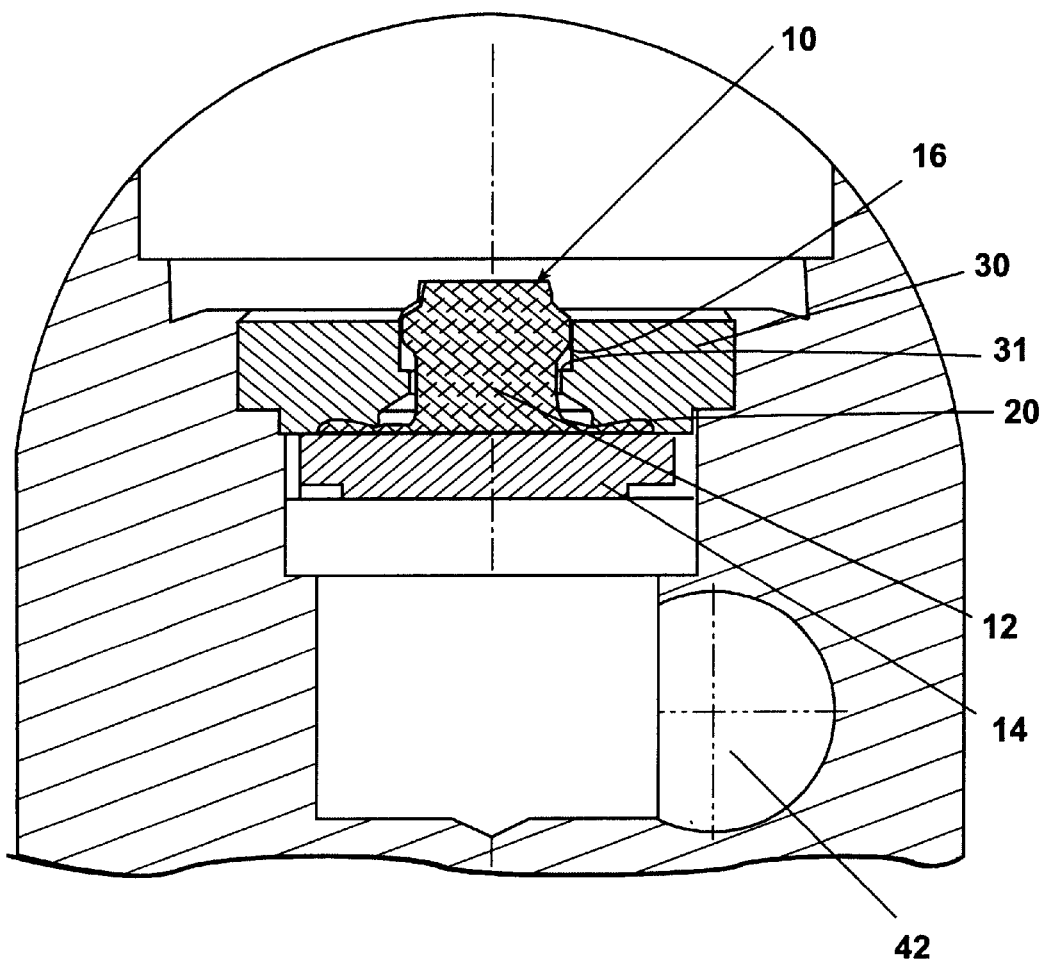
FIG. 5 is a section view showing a preferred evacuation and fill valve assembly in the closed position.

During evacuation, vacuum is applied at the master cylinder and is effectuated through the master cylinder connection 42. During this action, valve 10 is moved into an open position as shown in FIG. 4. Air in the low pressure circuit above the valve 10 and valve plate 30 assembly is permitted to flow through the valve 10 to the master cylinder connection 42. This creates a vacuum in the low pressure circuit without actuating the outlet valve 36 which is normally closed. During fill, hydraulic pressure is applied at the master cylinder and communicated through the master cylinder connection 42. The valve 10 may or may not move upwardly to a closed position depending on the fill pressure applied. During subsequent ABS tests (e.g., roll tests), the pressure differential created on the two sides of the valve will move it upward to the closed position to seal the valve 10 against the valve plate 30 as shown in FIG. 5. In the closed position, the retaining seal 16 rests above the retaining portion 31 of the valve plate 30, thereby retaining or "locking" the valve 10 in the closed position.

Once such a "closed" position is established, the valve 10 will normally remain in that position. For instance, during normal braking operation, a small vacuum is created in the master cylinder and may be communicated through the master cylinder connection 42 if the pedal is released very quickly. However, the valve 10 typically will not move from a "closed" to an open position by such a vacuum since the retaining seal 16 will be secured and retained above the retaining portion 31 of the valve plate 30, thereby prohibiting the undesired passage of air past the valve 10 to the master cylinder connection 42.

Figure 6:
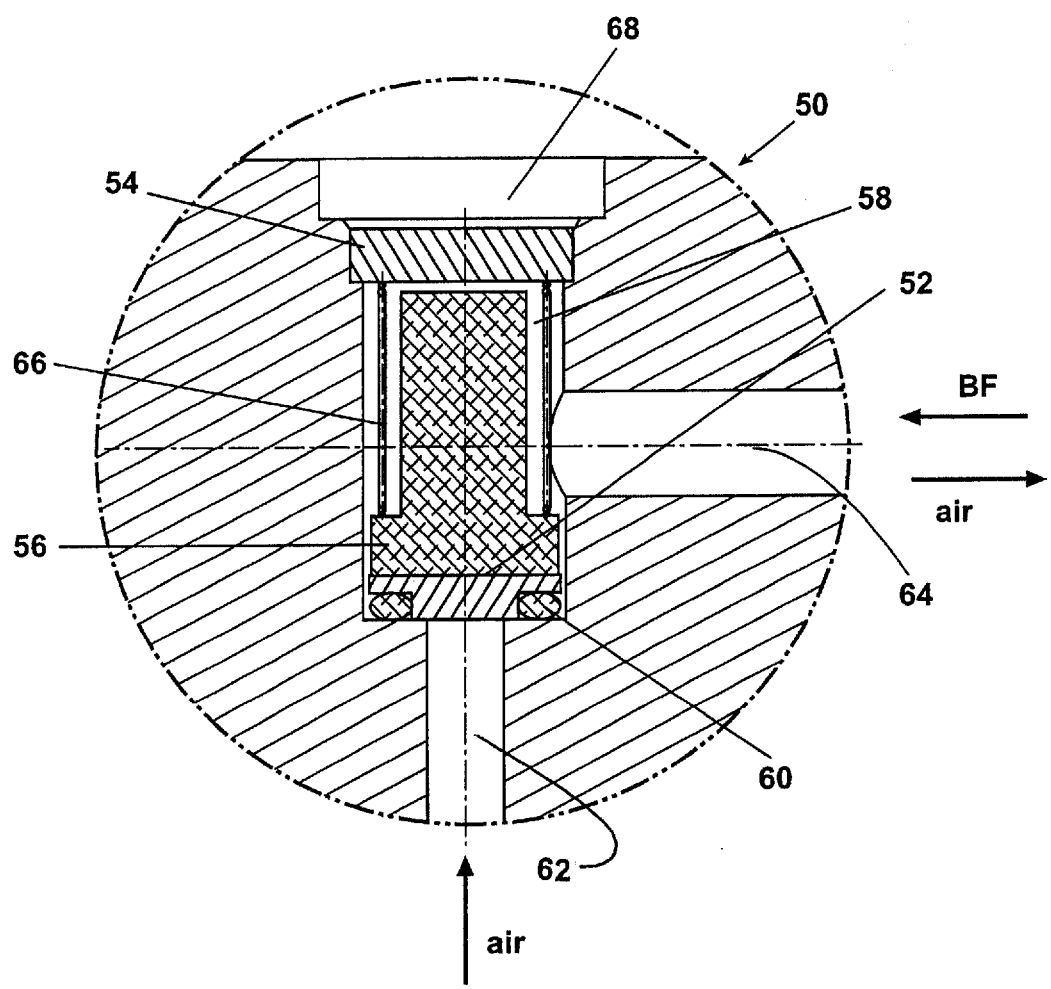
FIG. 6 is a section view of another preferred embodiment of an evacuation and fill valve assembly.

In another preferred embodiment of the present invention, rather than utilizing a pressure differential on different sides of a valve, as disclosed above, the non-powered evacuation, filling and sealing of the assembly is accomplished utilizing the expansive properties associated with a brake fluid-absorbing material. FIG. 6 illustrates a cross sectional view of a preferred example of such an embodiment. As shown therein, the evacuation and fill assembly 50 may be comprised of valve body 52, valve plug 54, plug 56, plug receiving portion 58, a rubber sealing 60, a first passage 62, and a second passage 64. The assembly 50 may optionally include one or more springs 66, if desired. The rubber sealing is somewhat optional, but is used to ensure a good seal of valve body 52. A bore 68 is shown positioned above the valve plug 54. The plug 54 can be used to seal the bore 68.

Preferably, plug 56 is comprised of a material that expands in or when exposed to brake fluid (BF), such as a rubber or a plastic. First passage 62 permits air to enter into the plug receiving portion 58. Second passage 64 permits brake fluid (BF) to enter the receiving portion 58 and air to evacuate the receiving portion 58.

After the receiving portion is filled with brake fluid, the plug 56 absorbs such fluid and expands. The expansion of the plug 56 establishes a generally permanent connection between the valve body 52 and the valve plug 54 as long as there is a sufficient volume of brake fluid in the system. Because the valve does not open or close thereafter, it cannot leak due to contamination of the brake fluid.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications will come within the teachings of this invention and that such modifications are within its spirit and the scope as defined by the claims.

What is claimed is:

1. An evacuation and fill valve assembly suitable for use in connection with a hydraulic brake system including a master cylinder connection, said assembly comprising:

at least one passageway including an opening; and a valve designed to seal the opening of said passageway;

wherein during evacuation of air from the system, said valve is in an open position relative to said passageway to permit air to flow past said valve to a master cylinder connection, and further wherein, after evacuation of air from the system and filling of the system with a given volume of brake fluid, said valve is moved to a closed position relative to said passageway, thereby providing a seal between said valve and said passageway provided said given volume of fluid is present in the system, wherein the valve is moved to a closed position relative to said passageway by a force selected from the group consisting of: a pressure differential on opposite surfaces of said valve and the expansion of a portion of said valve initiated by exposure to fluid within the system.

2. An evacuation and fill valve assembly suitable for use in connection with hydraulic brake system, said assembly comprising:

a plug formed from a material that expands in brake fluid; and a valve body including a plug receiving portion to receive the plug, said valve body further including at least two passages in communication with said plug receiving portion, wherein after the filling of the system with fluid, the plug expands and establishes a seal between the valve body and the valve plug, thereby prohibiting the passage of air.

3. An assembly as recited in claim 2, wherein the plug is comprised of plastic.

4. An assembly as recited in claim 2, wherein the plug is comprised of rubber.

5. An assembly as recited in claim 2, wherein the plug includes a rubber seal.

6. An assembly as recited in claim 2, wherein the assembly includes a spring.

7. An assembly as recited in claim 2, wherein at least one of said passages communicates brake fluid into communication with the assembly.

8. A non-powered method suitable for evacuating the air in a hydraulic brake system including a master cylinder connection, including the steps of:

providing at least one passageway including an opening; and providing a valve designed to seal the opening of said passageway;

causing said valve to remain in an open position relative to said passageway so as to permit air being evacuated from the system to flow past said valve to the master cylinder connection; and causing said valve to remain in a closed position relative to said passageway provided a given volume of fluid is present in the system, wherein a pressure differential on opposite sides of said valve caused the valve to remain in the closed position relative to said passageway, wherein the expansion of a portion of said valve causes said valve to remain in the closed position relative to said passageway.

* * * * *